United States Patent

[11] 3,597,055

| [72] | Inventor | Charles W. Neefe<br>Box 361, Big Spring, Tex. 79720 |
|---|---|---|
| [21] | Appl. No. | 794,723 |
| [22] | Filed | Jan. 28, 1969 |
| [45] | Patented | Aug. 3, 1971 |
| | | Continuation-in-part of application Ser. No. 570,107, July 11, 1966, now Patent No. 3,440,306, dated Apr. 22, 1969. |

[54] MONOCENTRIC BIFOCAL CONTACT LENS
1 Claim, 3 Drawing Figs.

[52] U.S. Cl. ......................................... 351/161, 351/168
[51] Int. Cl. .......................................... G02c 7/04, G02c 7/06
[50] Field of Search ............................. 351/161, 168, 172, 177

[56]         References Cited
       UNITED STATES PATENTS
1,903,593   4/1933   Martin ..................... 351/177 UX
3,037,425   6/1962   De Carle .................. 351/161
3,270,099   8/1966   Camp ....................... 351/161 X FOREIGN PATENTS
905,289     9/1962    Great Britain ............. 351/161
1,048,001   11/1966   Great Britain ............. 351/161
710,558     6/1965    Canada .................... 351/161
39/27,282   11/1964   Japan ..................... 351/161
662,879     3/1929    France .................... 350/168

OTHER REFERENCES
Akiyama Article in Contacto Vol. 4 No. 10 Oct. 1960, pgs. 461— 467 cited copy in 351/160

De Carle Article in Contacto Vol. 4 No. 6 June 1960 pgs. 185— 188 and 190— 193 cited copy in 351/160

Bier Article in Opthalmic Optician Vol. 5 No. 9 May 1, 1965 pgs. 439— 442 and 447— 454 cited copy in 351/160

Journal of the American Optometric Assoc. Vol. 38 No. 3 March 1967 pg. 240 cited Contacto Vol. 11 No. 3 Sept. 1967 pg. 12 cited

*Primary Examiner*—David H. Rubin
*Attorney*—Richards, Harris and Hubbard

ABSTRACT: A monocentric simultaneous vision bifocal contact lens having an embedded high index near vision segment and producing a vertical gradient focus visual effect.

PATENTED AUG 3 1971     3,597,055

INVENTOR
Charles W. Neefe

MONOCENTRIC BIFOCAL CONTACT LENS

This is a continuation in part of my previous application Ser. No. 570,107, filed July 11, 1966, for "A PROCESS FOR MAKING AN IMPROVED BIFOCAL LENS," now U.S. Pat. No. 3,440,306, issued Apr. 22, 1969.

Bifocal contact lenses composed of plastics of two different refractive indexes, as are now being made, have round segments with the optical center located at the geometric center of the reading segments. This causes a degree of image displacement due to the base down prism encountered with the transition from the distant segment to the near segment. This displacement requires reorientation and is a source of distraction. Also the upper edge of the segment is curved with a radius equal to the radius of the segment.

The herein disclosed bifocal contact lens overcomes these disadvantages. Using this lens design, any shape segment may be used, and we will use the semicircle with a straight top as an example only. It is understood that any segment shape is possible and any placement of the optical center is also possible with the present invention. It is desirable however to employ the monocentric design and place the optical center of the reading segment tangent to the upper straight edge of the semicircular reading segment. Also many suitable types plastics and adhesives may be substituted for the one stated herein.

Your attention is directed to the accompanying drawing, in which.

Figure 1:
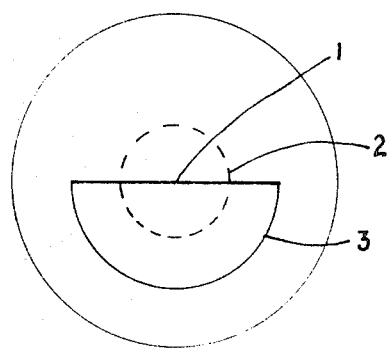
FIG. 1 shows the lens from the front in place over the pupil with a straight upper edge.

Two pieces of high index plastics, such as styrene index 1.60 or polyester index 1.53, are shaped into semicircular blocks as shown in FIG. 1 their flat side is then ground and finished to a satin smooth surface, but not polished. The plastic pieces are then warmed and cemented together using beeswax. After cooling, the two segments are cut and polished to the desired radius. The two pieces are again warmed, taken apart and all beeswax is removed with a solvent.

An aligning member is attached to the geometric center of one of the segments and inserted into the hole provided in the silicone rubber mold. The high index segment is positioned in the mold with the polished convex spherical surface facing upward and the flat surface toward the center of the mold cavity. The mold cavity is filled, covering the high refractive index segment with liquid methyl methacrylate to which has been added a room temperature active catalyst. The surface of the high index segment is treated with 95 percent ethyl alcohol prior to being placed in the mold. This alcohol treatment improves the bond between the reading segment and the distant portion. A coating such as titanium dioxide may be deposited upon the polished surface to improve adhesion if desired. The mold and contents are allowed to remain quiescent until the liquid monomer has polymerized. The blank is then heated to remove all traces of monomer and to release internal stress by anealing. Fluorescent material may be added to the surface coating to make the segment visible under ultraviolet light.

The concave surface is cut intersecting the low and high index materials, using a much longer radius than is used to form the segment block. The depth of the cut determines the size of the segment. The convex surface is cut in the usual manner to complete the optical surface of the lens.

Figure 2:
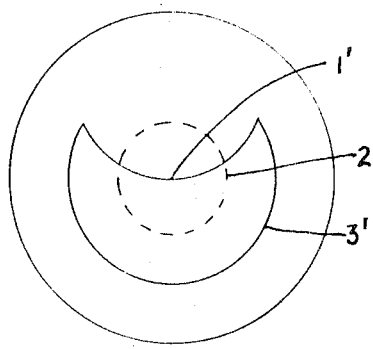
FIG. 2 shows the lens from the front in place over the pupil with a concave upper edge.
Figure 3:
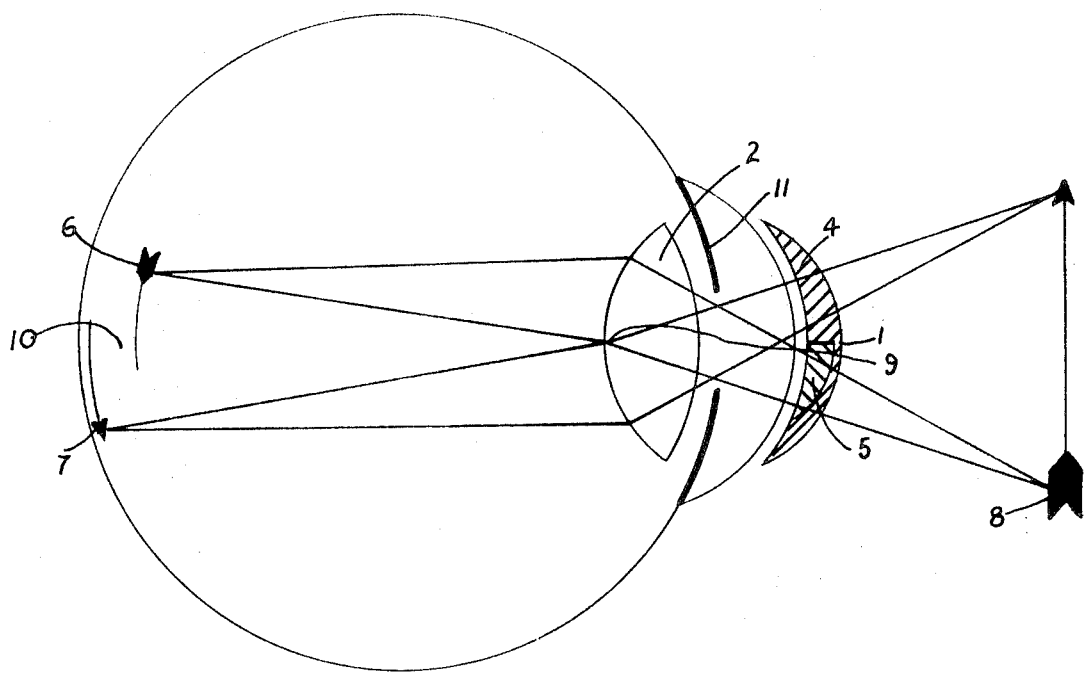
FIG. 3 shows the light pathway through the lens and eye.

The optical center of the reading segment and the distant segment are located at the same point 1 FIG. 1 and 1' FIG. 2, also shown at 1 in FIG. 3.

The optical centers 1 FIG. 1, 1' FIG. 2 and 1 FIG. 3 is centered over the pupil 2 FIG. 1, 2 FIG. 2 and 3 FIG. 3.

The higher plus reading segment 3 FIG. 1, 3' FIG. 2 and 5 FIG. 3 is positioned at the lower portion of the pupil as shown in FIGS. 1, 2 and 3.

FIG. 3 shows the pathway of light through the lens in place on the eye. The nodal points for the eye are located approximately 7 m/m behind the cornea at 9 FIG. 3. This due in part to the +12.00 diopters of refraction present in the crystalline lens 2 FIG. 3 and the limiting of the peripheral rays by the iris 11 FIG. 3. The eye is filled with fluids of a refractive nature whereby the light entering the eye is refracted approximately +43.00 diopters at the corneal surface and an additional +12.00 at the crystalline lens and since the light does not leave this fluid filled chamber the two nodal points are located together at a point approximately 7 m/m behind the anterior of the cornea.

This new bifocal lens functions as follow:

the optical center of the reading segment 1 FIG. 3 and the optical center of the distant segment 1 FIG. 3 are positioned at a common point within the pupil area 11 FIG. 3. Light from a distant object 8 FIG. 3 enters the eye and is focused upon the retina 6 and 7 FIG. 3. The rays from the lower part of the object 8 will pass through the higher plus reading segment 5 FIG. 3 and through the pupil 11 FIG. 3 and through the crystalline lens 2 FIG. 3. This focus is in front of the retina due to the additional positive refractive power present in the reading segment 5 FIG. 1.

Light from a distant object 8 FIG. 3 enters the upper part of the lens 4 FIG. 3 and passes through the pupil and is refracted by the crystalline lens 2 FIG. 3 to a focus on the retina 7 FIG. 3.

It is understood that light from all parts of the object 8 FIG. 3 enters all parts of the lens, however due to the nodal points 9 FIG. 3 being 7 m/m behind the prime refracting surface 1 FIG. 3 and the limitation of the pupil entrance made by the iris 11 FIG. 3 at a point located between the prime refracting surface and the nodal point a larger percentage of the light reaching the upper retinal image 6 FIG. 3 will pass through the reading segment 5 FIG. 3. The light reaching the lower retinal image 7 FIG. 3 will pass through the upper part of the contact lens. A zone 10 FIG. 3 will exist wherein an image will be in focus 7 FIG. 3 and a second image 6 FIG. 3 will be in register but out of focus. This overlapping of the in focus and out of focus images produces a gradient focus visual effect.

The use of the crescent shaped segment, FIG. 2, reduces the required vertical lens movement.

Various modifications can be made without departing from the spirit of this invention or the scope of the appended claims. The constants set forth in this disclosure are given as example and are in no way final or binding. In view of the above, it will be seen that the several objects of the invention are achieved and other advantages are obtained. As many changes could be made in the above constructions and methods without departing from the scope of the invention, it is intended that all matter contained in the above description or shown in the accompanying drawings shall be interpreted as illustrative and not in a limiting sense.

I claim:

1. A bifocal contact lens comprising:

a first generally circular main lens segment of concavo-convex form in section made from low index resinous material and shaped and dimensioned to be maintained upon the eye of the wearer with the concave surface conforming to the cornea of the eye such that the main lens segment replaces the natural cornea as a corneal surface and such that the optical center of said main lens segment is normally positioned in the region of the central pupil area of the eye of the wearer, a smaller second crescent-shaped lens segment of concavo-convex form in section made from high index resinous material with a shorter focal length than said first lens segment for near vision and embedded in the posterior concave surface of said first main lens segment, the optical center of said second lens segment being at the midpoint of the curved upwardly arched upper edge thereof and coincident with the optical center of said first main lens segment to provide a monocentric bifocal construction, the curved lower and side edges of said second lens segment being generally concentric with the generally circular outline of said first main lens segment, said lens when normally positioned on the eye providing for simultaneous distance and near vision through the first and second lens segments respectively, and the overlapping distance and near vision images formed on the eye retina in the region aligned with the coincident optical centers of the first and second lens segments producing a vertical gradient focus visual effect without displacement of the retinal image.